(12) United States Patent
Juan Mata

(10) Patent No.: US 8,348,651 B2
(45) Date of Patent: Jan. 8, 2013

(54) FACILITY FOR THE FORMING OF FROZEN GRANULES FROM FOOD LIQUIDS

(76) Inventor: Victorino Juan Mata, Tarragona (ES)

( * ) Notice: Subject to any disclaimer, the term of this patent is extended or adjusted under 35 U.S.C. 154(b) by 9 days.

(21) Appl. No.: 12/599,445

(22) PCT Filed: Jan. 15, 2008

(86) PCT No.: PCT/ES2008/000017
§ 371 (c)(1),
(2), (4) Date: Nov. 17, 2009

(87) PCT Pub. No.: WO2008/135607
PCT Pub. Date: Nov. 13, 2008

(65) Prior Publication Data
US 2010/0272840 A1    Oct. 28, 2010

(30) Foreign Application Priority Data

May 7, 2007 (ES) ................................ P200701210

(51) Int. Cl.
*A23L 3/375* (2006.01)
(52) U.S. Cl. ............... 425/10; 425/6; 425/7; 425/256; 425/379.1; 426/100; 426/444; 426/515; 426/524; 264/14; 264/28; 62/64; 62/373; 62/375
(58) Field of Classification Search .............. 425/6, 222, 425/256, 378.1, 526, 7, 10, 257, 379.1, 382 R; 264/14, 28; 62/52.1, 64, 74, 347, 373, 375, 62/376, 381, 512; 426/100, 101, 102, 418, 426/444, 512, 515, 524, 565, 660
See application file for complete search history.

(56) References Cited

U.S. PATENT DOCUMENTS

| | | | | |
|---|---|---|---|---|
| 3,102,865 A | * | 9/1963 | Sneary et al. | 521/88 |
| 3,964,270 A | * | 6/1976 | Dwyer | 62/138 |
| 4,073,158 A | * | 2/1978 | Guiller | 62/266 |
| 4,098,095 A | * | 7/1978 | Roth | 62/346 |
| 4,265,921 A | * | 5/1981 | Lermuzeaux | 426/444 |
| 4,429,549 A | * | 2/1984 | Randolphi | 62/342 |

(Continued)

FOREIGN PATENT DOCUMENTS

EP    0225081 A1    6/1987

(Continued)

OTHER PUBLICATIONS

International Search Report dated Jun. 5, 2008, issued in corresponding international application No. PCT/ES2008/000017.

*Primary Examiner* — Joseph Del Sole
*Assistant Examiner* — Seyed Masoud Malekzadeh
(74) *Attorney, Agent, or Firm* — Ostrolenk Faber LLP

(57) ABSTRACT

A facility that is especially suited for the freezing of juices and similar products, which includes a cooling tank that supplies the product by means of an impelling pump to a freezing chamber that receives a supply of a liquefied gas at a temperature of around −140° C., preferably nitrogen, and pressurized air through an electro-valve to transform the juice into micro-drops or pellets and to freeze the droplets or the pellets inside the freezing chamber, which then exit the chamber through one or more dispensing valves, said freezing not affecting the original characteristics of the juice, in terms of its vitamin, protein and enzyme content.

8 Claims, 1 Drawing Sheet

U.S. PATENT DOCUMENTS

| | | | | |
|---|---|---|---|---|
| 4,704,873 | A * | 11/1987 | Imaike et al. | 62/64 |
| 4,761,962 | A * | 8/1988 | Andersson | 62/63 |
| 4,848,094 | A * | 7/1989 | Davis et al. | 62/64 |
| 4,914,927 | A * | 4/1990 | Miller et al. | 62/381 |
| 5,126,156 | A * | 6/1992 | Jones | 426/418 |
| 5,219,383 | A * | 6/1993 | Minari et al. | 62/347 |
| 5,661,981 | A * | 9/1997 | Laux et al. | 62/64 |
| 5,948,456 | A * | 9/1999 | Jones et al. | 426/100 |
| 5,987,898 | A * | 11/1999 | Olofsson et al. | 62/63 |
| 6,070,416 | A * | 6/2000 | Germain et al. | 62/63 |
| 6,436,454 | B1 * | 8/2002 | Cox et al. | 426/101 |
| 6,494,049 | B1 * | 12/2002 | Jones et al. | 62/74 |
| 6,510,890 | B1 * | 1/2003 | Paskach et al. | 165/61 |
| 6,539,743 | B2 * | 4/2003 | Jones | 62/381 |
| 6,555,154 | B2 * | 4/2003 | Jones et al. | 426/524 |
| 7,018,670 | B2 * | 3/2006 | Baumer et al. | 426/660 |
| 7,163,048 | B2 * | 1/2007 | Colasso et al. | 165/11.1 |
| RE39,631 | E * | 5/2007 | Scherpf et al. | 426/302 |
| 7,455,868 | B2 * | 11/2008 | Kennedy et al. | 426/565 |
| 7,464,564 | B2 * | 12/2008 | Whiteside et al. | 62/342 |
| 2002/0144608 | A1 * | 10/2002 | Jones et al. | 99/517 |
| 2004/0219269 | A1 * | 11/2004 | Cathenaut et al. | 426/512 |
| 2005/0106301 | A1 * | 5/2005 | Jones | 426/524 |
| 2006/0029710 | A1 * | 2/2006 | McPherson et al. | 426/565 |
| 2006/0093714 | A1 * | 5/2006 | Nelson | 426/512 |
| 2006/0102016 | A1 * | 5/2006 | Ulrich et al. | 99/452 |
| 2006/0105083 | A1 * | 5/2006 | Brooker et al. | 426/101 |
| 2007/0065552 | A1 * | 3/2007 | Jones et al. | 426/524 |

FOREIGN PATENT DOCUMENTS

| | | |
|---|---|---|
| EP | 0332287 A1 | 9/1989 |
| EP | 478118 A1 | 4/1992 |
| EP | 0956773 A1 | 11/1999 |
| ES | 2133235 A1 | 5/2002 |
| ES | 2167265 A1 | 5/2002 |
| ES | 2194557 A1 | 11/2003 |
| ES | 2194558 A1 | 11/2003 |
| FR | 2766738 A1 | 2/1999 |
| GB | 1376972 A | 12/1974 |

* cited by examiner

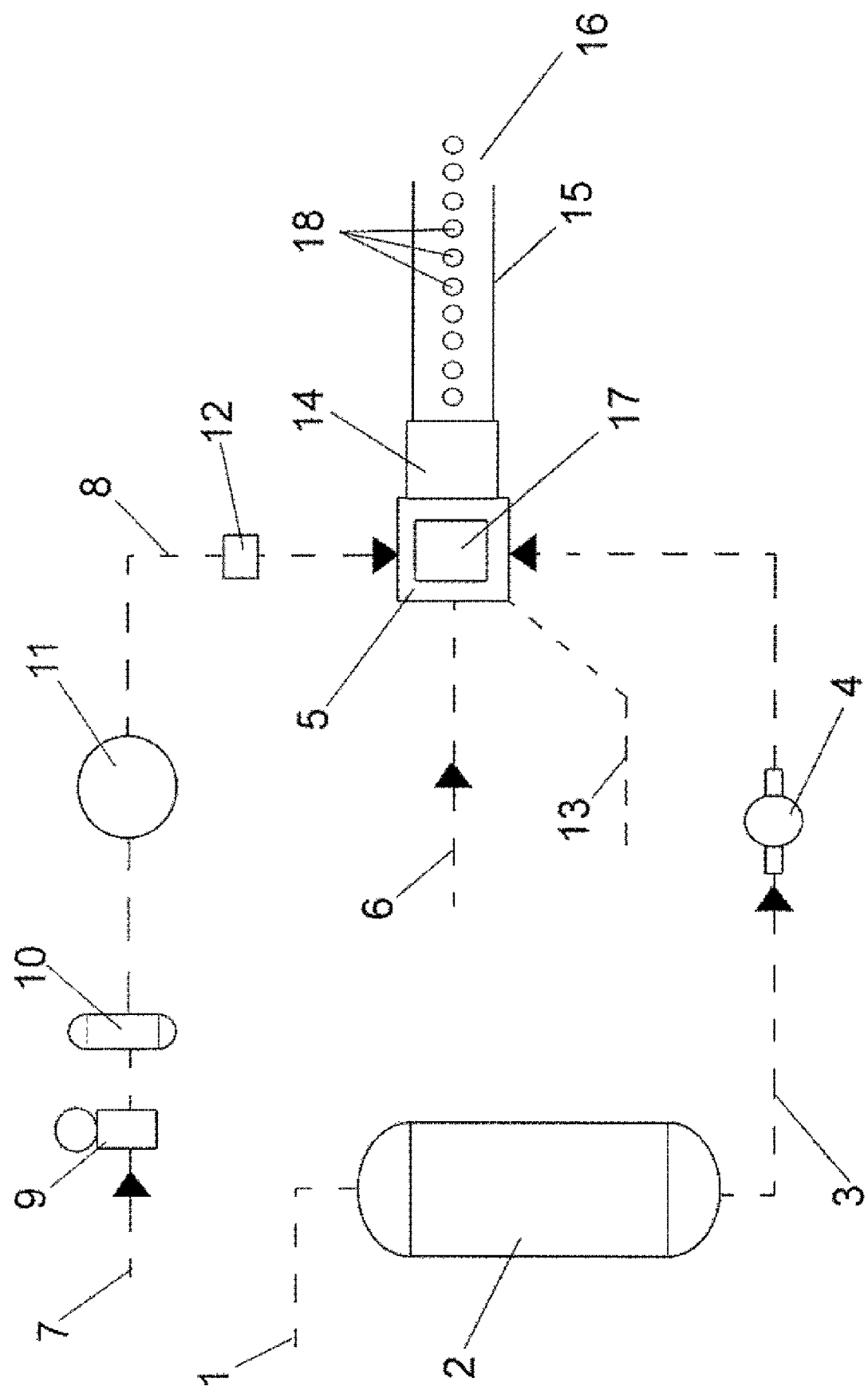

US 8,348,651 B2

FACILITY FOR THE FORMING OF FROZEN GRANULES FROM FOOD LIQUIDS

CROSS REFERENCE TO RELATED APPLICATIONS

The present application is a 35 U.S.C. §371 National Phase conversion of PCT/ES2008/000017, filed Jan. 15, 2008, which claims benefit of Spanish Application No. P200701210, filed May 7, 2007, the disclosure of which is incorporated herein by reference. The PCT International Application was published in the Spanish language.

OBJECT OF THE INVENTION

The present invention relates to a facility which is specially intended for transforming a food liquid, for example juice, purée, soup, etc., into frozen granules.

The object of the invention is to ensure that the product converted into granules maintains its original vitamin, protein and enzyme content.

BACKGROUND OF THE INVENTION

Food liquids, such as those mentioned earlier, are known to be prone to attack from microorganisms, consequently suffering modifications from both the chemical and/or biochemical and physical viewpoint.

At room temperature, microbial proliferations are very fast and the microorganisms present in all substances or food raw materials inevitably produce enzymes in the substrate during growth. Therefore, microbial enzyme activity modifies the flavour, texture, smell and appearance of food.

On the other hand, it is also known that a drop in temperature is parallel to a decrease in the development of the microorganisms which can ultimately alter the product.

It is also known that, from the physical viewpoint, if the temperature drop is fast, the ice crystals formed are small, while on the contrary, slow freezing produces thicker ice crystals which break the product fibres, due to which, upon unfreezing, said product has lost part of its proteins, enzymes, vitamin content, etc.

In conclusion, a drop in temperature to below freezing point inhibits the growth of most microorganisms, and if we take into account that the formation of ice crystals reduces water activity, the result is that the less water is available for microorganism growth, the less microbial activity.

In accordance with the foregoing, it must be pointed out that the application of an agent or liquefied gas to a liquid causes instant freezing thereof, especially if the liquid is in the form of a drop, macro drop or pellet at the time of application.

This application also benefits from the size of the drop for an exact fulfillment of the purpose of homogeneous, fast and effective freezing that will guarantee the micro-crystallisation of the fibres and cells contained in the food liquid, without subsequent breaking thereof upon unfreezing, thereby conserving all its original vitamin, protein and enzyme content.

The applicant is unaware of the current existence of any facility that is capable of producing pellets or granules from frozen liquids, through the application of liquefied gases.

DESCRIPTION OF THE INVENTION

The facility proposed by the invention allows the production of pellets or granules from frozen food liquids, using gases liquefied at very low temperatures for such purpose, by means of which practically instant freezing of the food liquids is obtained, which guarantees the micro-crystallisation of the cells and fibres contained in said liquid, thereby obtaining homogeneous, fast and effective freezing, and also ensuring that, upon unfreezing, breakage of said cells and/or fibres does not occur, whereupon the food liquid conserves its original organoleptic characteristics.

To this end and more specifically, the preconised facility is comprised of a product input tank, at a controlled temperature, and having adequate capacity, where said product in a liquid state is at a temperature of around 5° C., and from where the liquid is impelled, by means of a pump, to a freezing chamber to which liquefied gas is also supplied, preferably at a temperature of around −190° C., for which the liquid nitrogen effect may used, on being one of the most abundant elements in nature and consequently lower in cost.

Pressurised air also enters the same freezing chamber, through the corresponding electro-valve, in such a manner that the collision between the liquid food product and the air stream produces the pulverisation of said food product, previously cooled, converting it into the aforementioned pellets or micro balls, which are simultaneously frozen on contact with the liquefied gas.

The freezing chamber has one or more outlets, aided by respective bolsters/valves, dispensers, the number of which will vary based on the required production.

The balls or pellets thus obtained are also expelled outwards as a result of the compressed air stream supplied to the freezing chamber, wherein both electric coils are disposed to control the temperature of the liquefied gas that is supplied thereto and temperature reading probes, which send related data to a controller materialised in a computer system which, according to the needs at each moment, sends the relevant orders to the freezing chamber or chambers.

Finally, it remains only to point out that the pellets or balls of edible product are extracted from the cooled conduits that emerge from the respective dispensing valves, by means of endless screws.

DESCRIPTION OF THE DRAWINGS

For the purpose of complementing this description and helping to better understand the characteristics of the invention, in accordance with a preferred practical embodiment thereof, a single sheet with plans has been included as an integral part of this description, wherein a facility for the forming of frozen granules from food liquids, embodied in accordance with the object of the present invention, has been schematically represented in an illustrative but non-limiting manner.

PREFERRED EMBODIMENT OF THE INVENTION

In the aforementioned FIGURE we can observe how the liquid product in question, such as for example an edible juice, enters a cooling tank (2), having adequate capacity, through an inlet (1), wherein cooling means determine a temperature of around 5° C. for said product, which is constantly maintained.

The edible liquid circulates through a conduit (3) from the cooling tank (2), impelled by a pump (4), which introduces said product into a freezing chamber (5).

The freezing chamber (5) has a series of exit and entrance conduits necessary for the normal functional development of the facility, and consist of an inlet (6) for liquefied gas, preferably the aforementioned nitrogen at a temperature of around −190° C.; pressurised air also enters the chamber (5), specifically room air, which accesses the facility via the inlet (7) and flows through the conduit (8) towards the chamber (5), and includes the insertion of a manometer (9) to regulate the compressed air, a sanitary filter (10), a pressure reboiler (11) and an electro-valve (12) that determines the opening or closing of the access through which compressed air enters the freezing chamber (5), wherein the air contributes to product acceleration.

In a complementary manner, said chamber (5) has an outlet (13) towards the controller or PC that governs the facility. One or more dispensing valves (14) are disposed in said freezing chamber (5), extending along respective pipes (15) with a diameter of between 8 and 10 millimeters through which, in a cold atmosphere, the pellets or drops of frozen liquid are channeled towards the corresponding exit (16).

As mentioned earlier, there can be more than one freezing chamber (5) from each of which one or several dispensing valves (14) may emerge and, in any case, inside the extension pipe of said dispensing valves (14), through which the finished product will be obtained, a cold atmosphere (17) that favours the conservation of the pellets or granules (18) of frozen food liquid is established.

Finally, it remains only to point out that, in order to avoid the possible entrance of liquefied gas into the facility at a temperature below the aforementioned −140° C., heating coils to compensate said temperature and adjust it to the parameters established for such purpose have been envisaged in the freezing chamber (5).

What is claimed is:

1. A facility for the forming of frozen granules from food liquids, the facility comprising: a cooling tank that receives the food liquid through an inlet and retains the food liquid therein, the cooling tank being equipped with cooling means that allows the tank to maintain its temperature constantly, the cooling tank feeding by means of an impelling pump, a freezing chamber to which are supplied a liquefied gas at a temperature of around −140° C. and pressurized air via an electro-valve in such a manner that pellets or small granules of food liquid are generated in said freezing chamber, which instantly freeze and exit the chamber through one or more dispensing valves, wherein said freezing chamber includes a first inlet for receiving said liquified gas, a second inlet for receiving said pressurized air, and a third inlet for receiving the food liquid, wherein said facility is configured so that pressurized air enters said freezing chamber to realize a collision between the liquid food product and the air to pulverize said liquid food product into pellets or micro-balls which are simultaneously frozen on contact with said liquified gas, whereby the food liquid retains its original organoleptic characteristics.

2. A facility for the forming of frozen granules from food liquids, according to claim 1, wherein cooling means that allows the cooling tank to maintain its temperature allows the cooling tank to maintain its temperature at levels of around 5° C.

3. A facility for the forming of frozen granules from food liquids, according to claim 1, wherein the air enters the freezing chamber from an entrance and passes through a regulating manometer, a sanitary filter, a pressure reboiler and finally an electro-valve that opens and closes the passage of pressurised air to the aforementioned freezing chamber.

4. A facility for the forming of frozen granules from food liquids, according to claim 1, wherein heating coils are disposed in the freezing chamber to compensate for excessively low temperatures at the liquefied gas inlet.

5. A facility for the forming of frozen granules from food liquids, according to claim 1, wherein sensors, which supply information to a controller that governs the different facility parameters, are disposed in the freezing chamber.

6. A facility for the forming of frozen granules from food liquids, according to claim 1, wherein said liquified gas comprises nitrogen.

7. A facility for the forming of frozen granules from food liquids, according to claim 1, wherein said liquified gas comprises nitrogen.

8. A facility for the forming of frozen granules from food liquids, according to claim 5, wherein said controller comprises a computer system.

* * * * *